(12) United States Patent
Zhu et al.

(10) Patent No.: US 7,903,768 B2
(45) Date of Patent: Mar. 8, 2011

(54) METHOD AND APPARATUS FOR IMPLEMENTING MATCHED FILTERS IN A WIRELESS COMMUNICATION SYSTEM

(75) Inventors: Xia Zhu, Shanghai (CN); Yan Li, Shanghai (CN)

(73) Assignee: ST-Ericsson SA, Geneva (CH)

( * ) Notice: Subject to any disclaimer, the term of this patent is extended or adjusted under 35 U.S.C. 154(b) by 775 days.

(21) Appl. No.: 11/815,206

(22) PCT Filed: Jan. 19, 2006

(86) PCT No.: PCT/IB2006/050195
§ 371 (c)(1),
(2), (4) Date: Aug. 1, 2007

(87) PCT Pub. No.: WO2006/079949
PCT Pub. Date: Aug. 3, 2006

(65) Prior Publication Data
US 2008/0316993 A1 Dec. 25, 2008

(30) Foreign Application Priority Data
Jan. 31, 2005 (CN) .......................... 2005 1 0005059

(51) Int. Cl.
*H03D 1/00* (2006.01)
(52) U.S. Cl. ......... 375/343; 370/320; 370/335; 370/342; 370/441; 370/479; 370/515; 708/300; 708/422; 708/813; 708/819

(58) Field of Classification Search .................. 375/343; 370/320, 335, 342, 441, 479, 515; 708/300, 708/422, 813, 819
See application file for complete search history.

(56) References Cited

U.S. PATENT DOCUMENTS

| | | | | |
|---|---|---|---|---|
| 5,931,893 A * | 8/1999 | Dent et al. | ..................... | 708/422 |
| 6,005,887 A * | 12/1999 | Bottomley et al. | ........... | 375/147 |
| 6,330,292 B1 * | 12/2001 | Dent et al. | ..................... | 375/343 |
| 6,366,938 B1 * | 4/2002 | Levison et al. | ............... | 708/422 |
| 6,507,603 B1 * | 1/2003 | Haga et al. | ..................... | 375/147 |
| 6,567,483 B1 * | 5/2003 | Dent et al. | ..................... | 375/343 |
| 6,584,142 B1 * | 6/2003 | Chen et al. | ..................... | 375/143 |
| 7,403,584 B2 * | 7/2008 | Koenenkamp | ................ | 375/371 |
| 7,672,361 B2 * | 3/2010 | Underbrink et al. | .......... | 375/152 |

FOREIGN PATENT DOCUMENTS
WO 0103294 A1 1/2001

OTHER PUBLICATIONS

Ho, H; et al "Complex Matched FIR Filters for Detection of Primary and Secondary Synchronization Codes om W-CDMA" CCECE 2003. Canadian Conference on Electrical and Computer Engineering. vol. 3 of 3, May 4, 2003, pp. 227-230.

* cited by examiner

*Primary Examiner* — Juan A Torres (57) ABSTRACT

The present invention discloses a method and apparatus for implementing matched filter in a system using QPSK modulation. In the present invention, a multiplier is changed as a multiplexer by using the characteristic of the pilot sequence (or training sequence) so as to implement the matched filter.

22 Claims, 8 Drawing Sheets

METHOD AND APPARATUS FOR IMPLEMENTING MATCHED FILTERS IN A WIRELESS COMMUNICATION SYSTEM

FIELD OF THE INVENTION

The present invention relates to a wireless communication system, in particular to a simplified method and apparatus for implementing matched filters in a wireless communication system.

BACKGROUND OF THE INVENTION

In Direct Sequence Spread Spectrum of a Code Division Multiple Access (CDMA) system, a high rate spread spectrum sequence with pseudo-random noise properties is usually adopted to spread the frequency of the lower rate base band signal, thereby obtaining a channel spread spectrum gain to improve the transmission quality of signals. In a receiver, the same spread spectrum sequence is used to perform opposite processing on the received signal, i.e. despreading processing, to restore the original data information. An important factor here is the synchronization between the transmitter and receiver. In general, a pre-defined sequence usually called SC (i.e. synchronization code) is inserted in each sub-frame for frame synchronization, and also a pre-defined known sequence (training sequence) is inserted in each time slot for time slot synchronization in the DS-CDMA (Direct Spread-Code Divided Multiple Access) system, the receiving terminal can achieve the signal synchronization between the transmitter and received just through performing matched filtering (correlation) on the pre-defined known sequence.

A conventional system of CDMA receiver is, in general, designed to realize the synchronization by using the matched filter containing a large amount of electronic components, wherein the matched filter occupies a larger area and the implementation thereof is more expensive. Especially, a CDMA receiver uses a matched filter to match a code sequence to detect the correlation peak. A matched filter comprises, in general, a delay register, a multiplier and an adder. Since the matched filter needs to contain a large amount of electronic components, the design of system is expensive and the system occupied a larger area.

Figure 1:
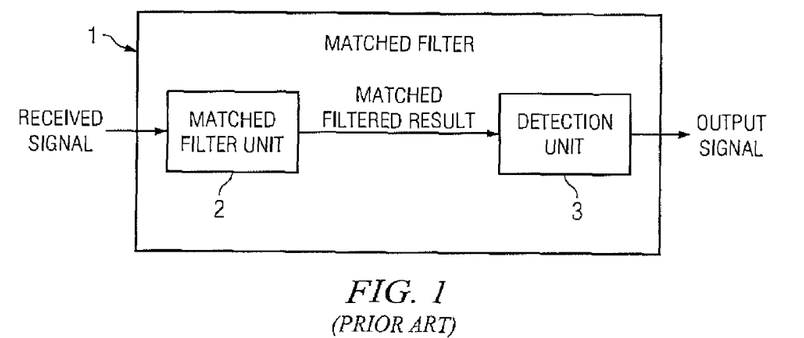
FIG. 1 is a functional block diagram of the matched filter in the receiver of a wireless communication system.

Now referring to FIG. 1, this figure shows the function of the matched filter accomplished in a CDMA receiver. When a receiver receives an input signal, the matched filter is tuned to match a code sequence. In systems using Quadrature-Phase-Shift-Keying (QPSK) modulation, such as the TD-SCDMA (Time Division-Synchronous Code Division Multiple Access) systems, the code sequence is inserted in the signals (i.e. digital sample) received by the receiver. The object of providing a code sequence is to enhance the operation of communication systems. Particularly, in CDMA wireless communication systems, the spread spectrum technology is very suitable to provide stable data transmission in a wireless environment with severe interference.

On the other hand, in CDMA systems, multiple users share communication channels on the same spectrum and in the same time. In order to discriminate one transmission from another, every UE (User Equipment) has a unique synchronization code sequence. The synchronization sequence usually has a good auto-correlation performance, so it helps UE to identify the synchronization code rapidly and accurately without any prior knowledge about timing reference and also helps base station to discriminate different code used by different UE. In implementation, a matched filter is usually used for synchronization and discrimination of different UE in DS-CDMA system. Just as shown in FIG. 1, a matched filter 1 comprises a matched filter unit 2 and a detection unit 3, wherein the matched filter unit 2 is used to perform matched filtering on the code sequence in an input data stream, the detection unit 3 is used to detect the matched filter output from the matched filter unit 2, wherein a higher output value of the matched filter unit 2 indicates a more tuned match with the expected code sequence. This process is also called correlation process. Hence a high output value represents a good correlation of input with the code sequence of interest. What is more, in flat-fading channel, the peak output value within a sub-frame/time slot can be used as the channel estimation value for this sub-frame/time slot.

Figure 2:
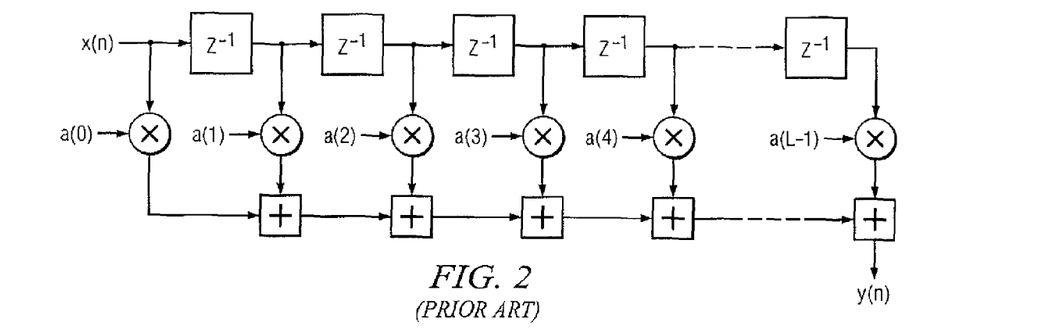
FIG. 2 is a functional block diagram of the hardware implementation of the matched filter in the prior art.

Referring to FIG. 2, this figure shows a schematic diagram illustrating a Finite Impulse Response (FIR) filter for implementing matched filters in prior art. Just as shown in FIG. 2, to match a code sequence with length L, L delay registers, L multiplier and L adders are needed. That is to say, in the prior art, more hardware components are needed to realize the matched filter. And it is commonly known that the hardware implementation of a multiplier is more complex.

In view of the above reasons, it's needed to provide a new hardware implementation of matched filters to realize the desired function of matched filter by using less electronic components and relatively more simple hardware structure.

OBJECT AND SUMMARY OF THE INVENTION

An object of the invention is to provide a novel improved method and functional processing for simplifying hardware structure of the matched filter in CDMA systems, in particularly for the matched filter in systems using QPSK modulation, the character of the pilot sequence (or training sequence) is used to replace the multiplier in the prior art with a selector (which can be realized by a multiplexer) so as to implement matched filters.

According to the first aspect of the invention, it provides a method for implementing matched filters in a wireless communication system, comprising the steps of: oversampling and extracting a pre-processed received signal so as to obtain the in phase components (I-components) and the quadrature components (Q-components) of respective sample points in a plurality of sampling sequences; and converting and combining the I-components and the Q-components of respective sample points in the same sampling sequence for the respective sampling sequence according to a pre-defined selection signal so as to obtain a plurality of corresponding matched filtered results.

Preferably, the pre-defined selection signal is a selection signal based on a known training sequence, wherein the length of each sampling sequence is equal to the length of the known training sequence.

According to the second aspect of the invention, it provides an apparatus for implementing matched filter in a wireless communication system, comprising: an oversampling and extracting means for oversampling and extracting a pre-processed received signal so as to obtain the I-components and the Q-components of respective sample points in a plurality of sampling sequences; and a conversion process means for converting and combining the I-components and the Q-components of respective sample points in the same sampling sequence for the respective sampling sequence according to a pre-defined selection signal so as to obtain a plurality of corresponding matched filtered results.

Preferably, the matched filter further comprises a pre-defined means for setting the pre-defined selection signal based on the selection signal of a known training sequence, wherein respective sampling sequences are of the same length as the known training sequence.

As compared with conventional methods, the apparatus and method for implementing matched filters in the receiver of a wireless communication system according to the invention can effectively reduce the complexity of hardware implementation of matched filters and reduce circuit area.

Other objects and achievements of the present invention will become apparent and more thorough understanding can be obtained through the following description of accompanying drawings and appended claims.

BRIEF DESCRIPTION OF THE DRAWINGS

Hereinafter, the preferred embodiments of the invention will be described with reference to the drawings, in which.

In all the accompanying drawings, same reference numeral denotes similar or identical feature and function.

DETAILED DESCRIPTION OF THE INVENTION

Figure 3:
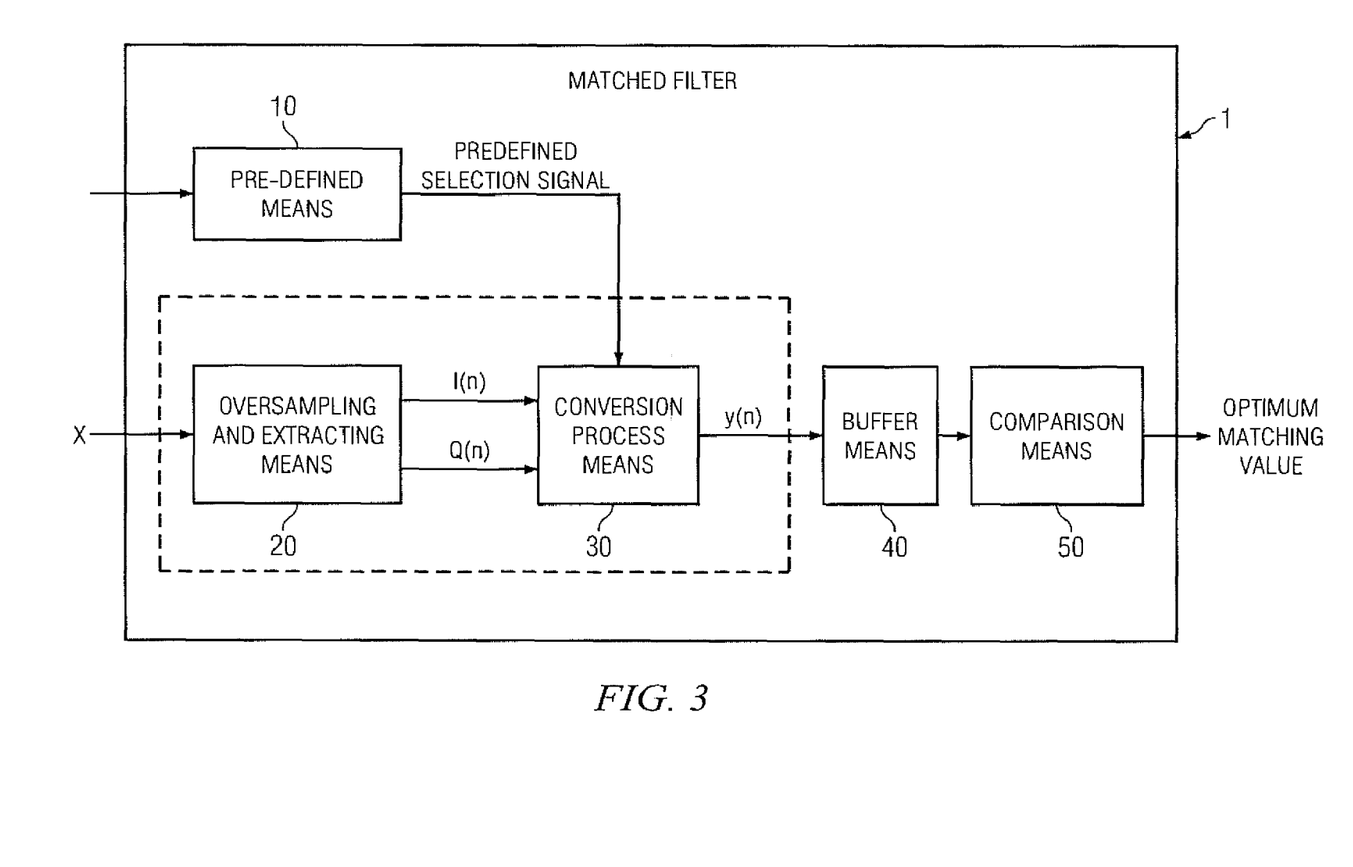
FIG. 3 is a block diagram of the matched filter according to an embodiment of the invention.

FIG. 3 illustrates a block diagram of the matched filter according to the first embodiment of the invention. In the receiver of a wireless communication system, a received input signal is first pre-processed and then is transmitted to the matched filter. As shown in FIG. 3, the matched filter 1 includes an oversampling and extracting means 20 for oversampling and extracting the pre-processed received signal so as to obtain the I-components and the Q-components of each sample point in a plurality of sampling sequences; and a conversion process means 30 for converting and combining the I-components and the Q-components of respective sample points in the same sampling sequence for respective sampling sequence according to a pre-defined selection signal so as to obtain a plurality of corresponding matched filtered results, wherein the pre-defined selection signal can be generated by a pre-defined means 10 based on the selection signal of a known training sequence. Preferably, the length of each of the sampling sequences equals the length of the known training sequence.

During implementation, the oversampling and extracting means 20 can first oversample the received signal to obtain a plurality of sampling sequences, and then process each sample point of the plurality of sampling sequence so as to extract the I-component and the Q-component of each sample point; alternatively, the oversampling and extracting means 20 can first extract the I-components and the Q-components of the received signal and then oversample the I-component and the Q-component respectively based on the same timing reference, in this way the I-component and the Q-component of each sample point in the plurality of sampling sequence can also be obtained.

Additionally, the matched filter 1 may preferably comprise: a buffer means 40 for buffering the plurality of matched filtered results; and a comparison means 50 for comparing the plurality of matched filtered results that are buffered so as to determine an optimum matched sampling sequence, wherein the value of the matched filtered result corresponding to the optimum matched sampling sequence is the greatest.

Figure 4:
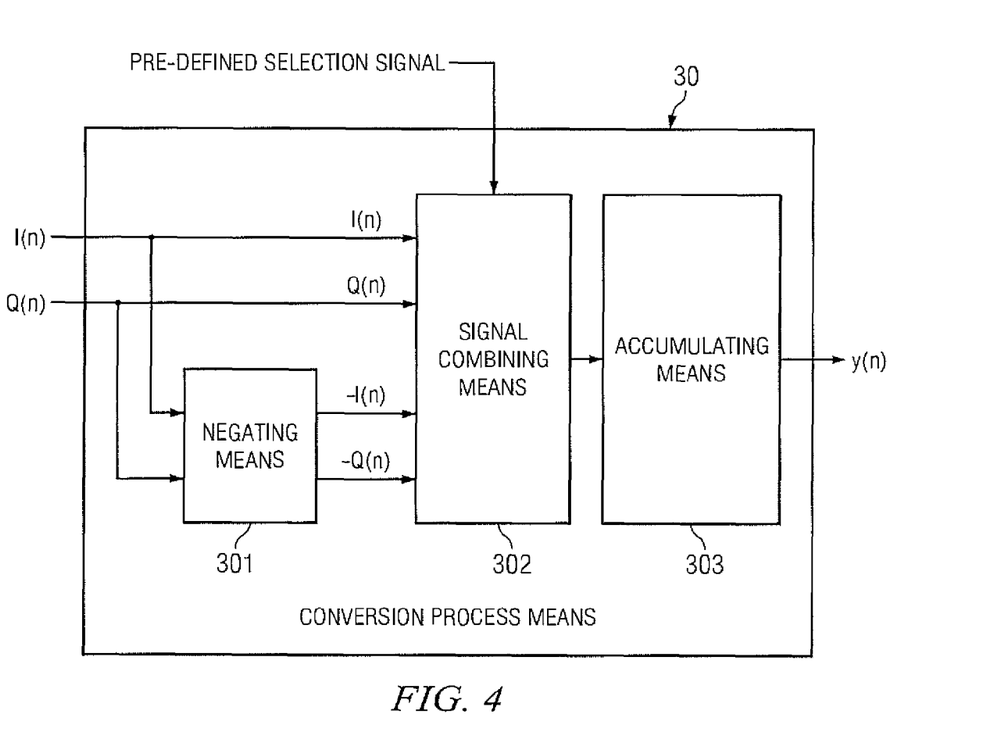
FIG. 4 is a configuration schematic diagram of the conversion process means in the matched filter according to an embodiment of the invention.

FIG. 4 shows configuration schematic diagram of the conversion process means in the matched filter as shown in FIG. 3. The conversion process means 30 comprises a negating means 301, a signal combining means 302 and an accumulating means 303, wherein the negating means 301 is used to perform negation operation of the I-components and the Q-components of the respective sample points so as to obtain the negated I-components and the negated Q-components; while the signal combining means 302 is used to perform pre-defined combination operation of the I-components of respective sample points, the negated I-components, the Q-components and the negated Q-components, so as to obtain the corresponding output results of the respective sample points; while the accumulating means is used to perform accumulation operation on the output results to which respective sample points in the same sampling sequence correspond for the sampling sequences so as to obtain the matched filtered results corresponding to the sampling sequences.

Figure 5:
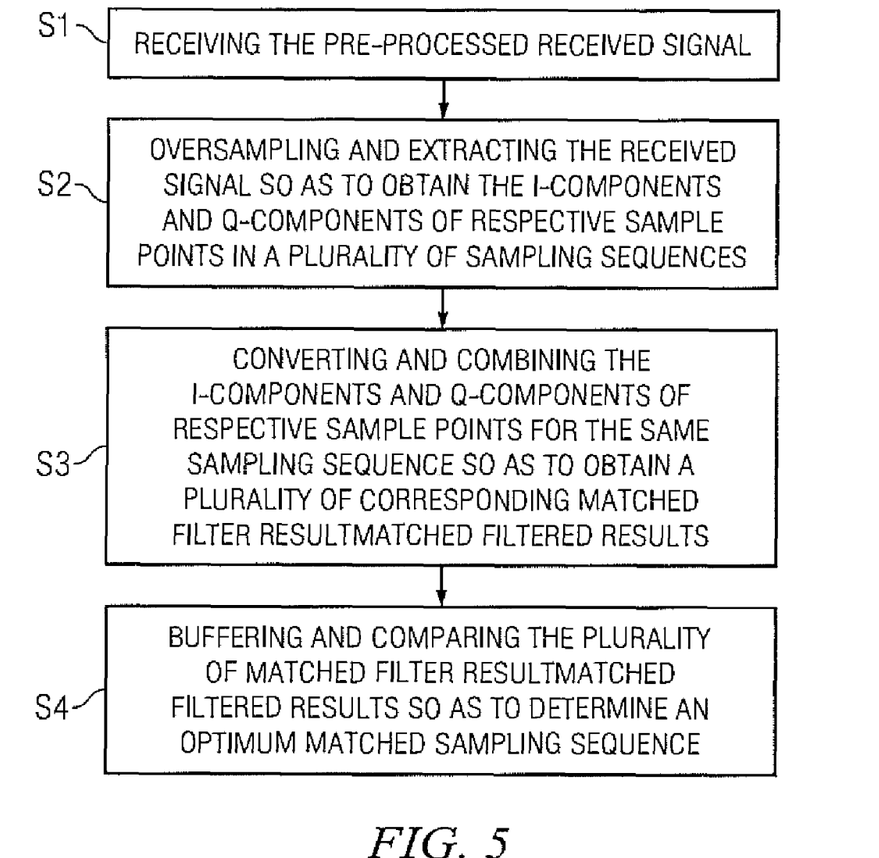
FIG. 5 is a flow chart of a method for implementing matched filter in a wireless communication system according to an embodiment of the invention.

FIG. 5 is a flow chart of a method for implementing matched filter in a wireless communication system according to an embodiment of the invention. In the receiver of a wireless communication system, the received input signal is first pre-processed and then experiences matched filter processing. In step S1, the pre-processed received signal is received, and then it comes to step S2. In step S2 the I-components and the Q-components of respective sample points for the same sampling sequence are converted and combined so as to obtain a plurality of corresponding matched filtered results, after that, it enters step S3, the I-components and the Q-components of respective sample points for the same sampling sequence are converted and combined so as to obtain a plurality of matched filtered results corresponding to a plurality of sampling sequences, wherein the pre-defined selection signal is generated based on the selection signal of a known training sequence. Furthermore, the respective sampling sequences are preferably of the same length as the known training sequence.

During implementation, in step S2, the received signal can first be oversampled to obtain a plurality of sampling sequences, then each sample point of the plurality of sampling sequence is processed so as to extract the I-component and the Q-component of each sample point; alternatively, in step S2, the I-component and the Q-component of the received signal can first be extracted and then be oversampled respectively based on the same timing reference, in this way the I-component and the Q-component of each sample point in the plurality of sampling sequence can also be obtained.

In addition, as shown in FIG. 5, the method of implementing matched filtering on the received signal in a wireless communication system receiver preferably include a further step 4 following step S3. In step S4, a plurality of matched filtered results corresponding to the plurality of sampling sequences are buffered and compared so as to determine an optimum matched sampling sequence, wherein the value of the matched filtered result corresponding to the optimum matched sampling sequence corresponds is the greatest.

Specifically, step S3 of the matched filter method as shown in FIG. 5 may comprise the sub-steps of:
performing negation operation on the I-components and the Q-components of the respective sample points so as to obtain the negated I-components and the negated Q-components;
performing pre-defined combination operation of the I-components of respective sample points, the negated I-components, the Q-components and the negated Q-components, so as to obtain the corresponding output results of the respective sample points;
performing accumulation operation on the output results to which respective sample points in the same sampling sequence correspond for the sampling sequences, so as to obtain the matched filtered results corresponding to the sampling sequences.

First Embodiment

In a mobile communication system employing QPSK modulation, the amplitude of a complex number is always 1 when each synchronization code (SC) of the sequence (i.e. a pre-defined training sequence) is mapped to the complex symbol, and the phases of the complex symbol have a difference of 90°. Therefore, after mapping to complex symbols, each SC (i.e. synchronization code) can only be one of the four values selected from the complex set with amplitude 1. When the phase angle of a signal is (0°, 180°, 90°, 270°), a typical set of this value is represented by (1, −1, j, −j), and when the phase angle of the signal is (45°, 315°, 135°, 225°), the other set of the value is (1+j, 1−j, −1+j, −1−j).

Specifically, in a TD-SCDMA system, the numeric value of each unit of the sequence is one from the set $\{1, -1, j, -j\}$. Assume the input of the matched filter in the receiver as x, the input sample after being oversampled is $x(n)=I(n)+jQ(n)$, wherein $I(n)$ is an In-phase component (I-component), and $Q(n)$ is a quadrature component (Q-component), both of them can be obtained by using extracting processing; and $ss(i)$ is the ith code chip of the pre-defined SC sequence. Therefore, the following equations can be used to represent the I-component and Q-components of the product of the input sample and corresponding code chips in the pre-defined SC sequence:

$$\text{Re}[y(n)] = \text{Re}[x(n) \cdot ss^*(i)] = \begin{cases} I(n) & ss^*(i) = 1 \\ -I(n) & ss^*(i) = -1 \\ -Q(n) & ss^*(i) = j \\ Q(n) & ss^*(i) = -j \end{cases} \quad (1)$$

$$\text{Im}[y(n)] = \text{Im}[x(n) \cdot ss^*(i)] = \begin{cases} Q(n) & ss^*(i) = 1 \\ -Q(n) & ss^*(i) = -1 \\ I(n) & ss^*(i) = j \\ -I(n) & ss^*(i) = -j \end{cases}$$

wherein $ss^*(i)$ is the conjugate value of $ss(i)$. As $y(n)=\text{Re}[y(n)]+j\text{Im}[y(n)]$, it can be deduced that the matched filtered result obtained for each sample point of the plurality of sampling sequences is one from set $\{I+jQ, -I-jQ, -Q+jI, Q-jI\}$, wherein I is the I-component, Q is the Q-component, −I is the negated I-component, −Q is the negated Q-component.

In a Wideband Code Division Multiple Access (WCDMA) system, however, the numeral value of each unit of the SC sequence is one from set $\{1+j, 1-j, -1+j, -1-j\}$. Likewise, assume the input of the matched filter in the receiver as x, the input sample after being oversampled is $x(n)=I(n)+jQ(n)$, wherein $I(n)$ is an I-component, and $Q(n)$ is a Q-component, both can be obtained by using extracting processing; $ss(i)$ is the ith code chip of the pre-defined SC sequence. Therefore, the following equations can be used to represent the I-component and Q-components of the product of the input sample and corresponding code chips in the pre-defined SC sequence:

$$\text{Selector5} = \text{Re}[y(n)] = \text{Re}[x(n) \cdot ss^*(i)] = \begin{cases} I-Q & ss^*(i) = 1+j \\ I+Q & ss^*(i) = 1-j \\ -I-Q & ss^*(i) = -1+j \\ -I+Q & ss^*(i) = -1-j \end{cases} \quad (2)$$

$$\text{Selector5} = \text{Re}[y(n)] = \text{Re}[x(n) \cdot ss^*(i)] = \begin{cases} I+Q & ss^*(i) = 1+j \\ -I+Q & ss^*(i) = 1-j \\ I-Q & ss^*(i) = -1+j \\ -I-Q & ss^*(i) = -1-j \end{cases}$$

Since $y(n)=\text{Re}[y(n)]+j\text{Im}[y(n)]$, it can be deduced that the matched filtered result obtained for each sample point of the plurality of sampling sequences is one from set $\{(I-Q)+j(I+Q), (I+Q)+j(-I+Q), (-I-Q)+j(I-Q), (-I+Q)+j(-I-Q)\}$, wherein I is the I-component, Q is the Q-component, −I is the negated I-component, −Q is the negated Q-component.

Figure 6:
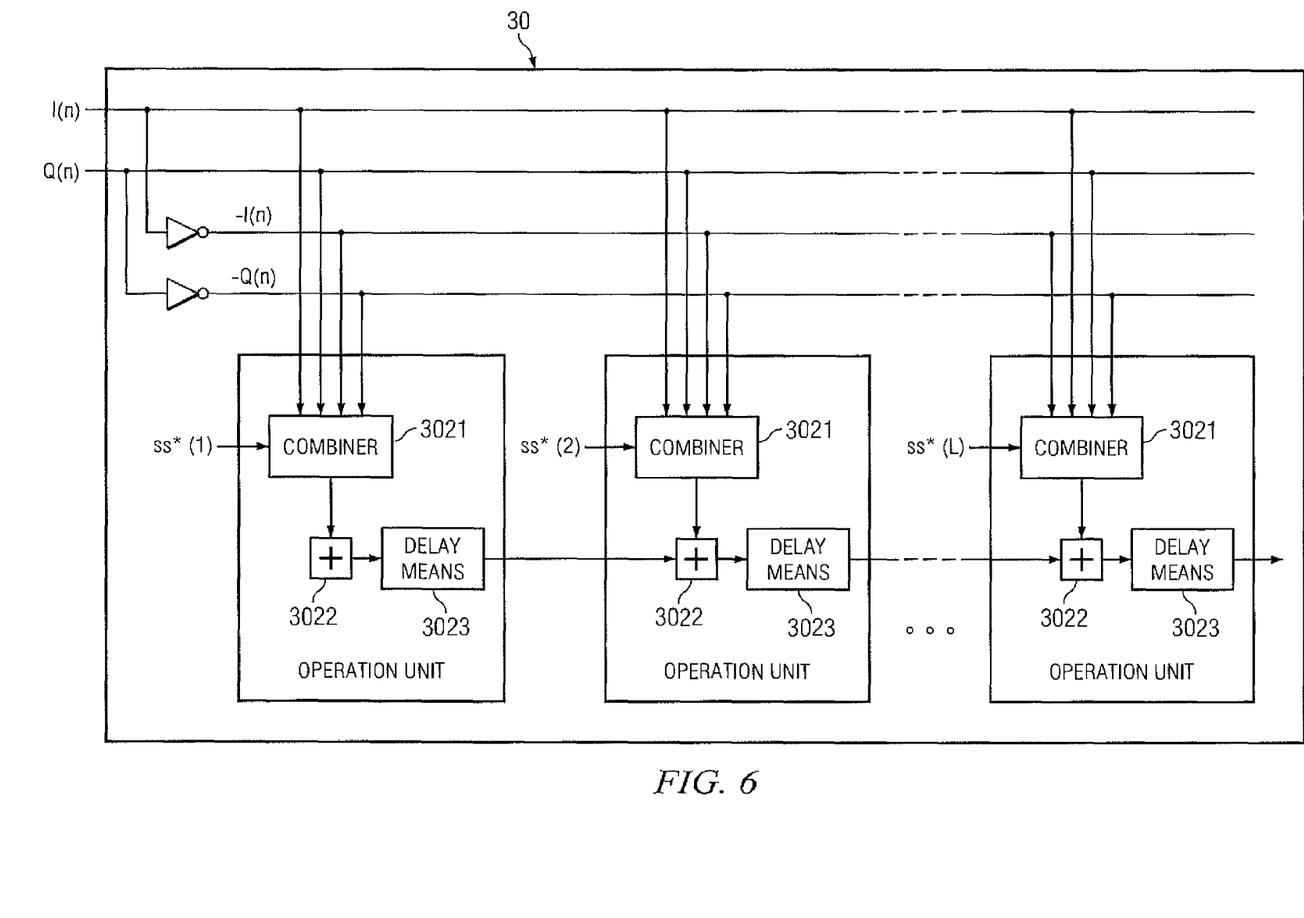
FIG. 6 is a schematic diagram of a circuit implementing manner of the conversion process means as shown in FIG. 3 and FIG. 4.

FIG. 6 is a schematic diagram of a specific circuit implementation manner of each circuit component of the conversion process means 30 as shown in FIG. 3 and FIG. 4. Suppose the length of the pre-defined training sequence in the wireless communication system receiver is L, the conversion process means 30 includes L same operation units, each comprising a combiner 3021 (which can be realized by a multiplexer), an adder 3022 and a delay means 3023, wherein the delay time of the delay means 3023 is the time interval of two adjacent sample points in each sampling sequence which can be realized by a plurality of delay registers. The combiner 3021 performs, based on a set of pre-defined selection functions, various combination operations of the I-components, Q-components, the negation of I-components and the negation of Q-components of the input sample, the result is one of the set of pre-defined result. For a TD-SCDMA system, specifically, as shown in the above equation (1), the set of expected results is one of the set $\{I+jQ, -I-jQ, -Q+jI, Q-jI\}$, wherein I is the I-component, Q is the Q-component, −I is the negated I-component, −Q is the negated Q-component. For a WCDMA system, the set of expected results is the set $\{(I-Q)+j(I+Q), (I+Q)+j(-I+Q), (-I-Q)+j(I-Q), (-I+Q)+j(-I-Q)\}$, wherein I is the I-component, Q is the Q-component, −I is the negated I-component, −Q is the negated Q-component.

As shown in the above equations (1) and (2), the I-component and Q-component of the output result y of the conversion processor 30 can be computed separately. In hardware implementation of baseband, the conversion process means 30 may be conveniently divided into two portions, i.e. one circuit portion for producing the I-component (i.e. I-component) of a matched filtered result and the other circuit portion for producing the Q-component (i.e. Q-component) of a matched filtered result, wherein both circuit portions can be realized by a specific circuit structure as shown in FIG. 5, the only difference between them only resides in a difference of the combination functions of the combiner shown in FIG. 6.

As stated above, for a WCDMA system, according to the above equation (2), for each sample point x(n), the I-component Re[y(n)] and the Q-component Im[y(n)] are {(I−Q), (I+Q), (−I−Q), (−I+Q)} and {(I+Q), (−I+Q), (I−Q), (−I−Q)} dependent on the value of the corresponding code ss*(i) (i.e. the conjugate value of ss(i)) in a SC sequence (i.e. a pre-defined training sequence). Therefore, as for the two circuit portions of I-components and Q-components of the output result, the difference resides in different combination functions of the combiner, as shown in the two equations of the above equation (2) respectively. For a TD-SCDMA system, according to the above equation (1), for each sample point x(n), the in phase components Re[y(n)] and quadrature Im[y(n)] of the matched filtered result are {I, −I, −Q, Q} and {Q, −Q, I, −I} dependent upon the value of corresponding code ss*(i) (i.e. the conjugate value of ss(i)) in a SC sequence (i.e. a pre-defined training sequence). Therefore, as for the two circuit portions of I-components and Q-components of the output result, a selector can be used to realize the combiner 3021, the difference resides in different selection functions of the selector, just as shown in the two equations of the above equation (1) respectively, this the circuit is much simplified.

In TD-SCDMA systems, the synchronization sequence for sub-frame is Downlink-Pilot-Time-Slot (DwPTS) and the synchronization sequence for time-slot is training sequence. Both the DwPTS and the training sequence are alternating real and imaginary numbers. The odd codes of the DwPTS and training sequence are always imaginary numbers, while the even codes of the DwPTS and training sequence are always real numbers. In order to calculate the I-component Re[y] of the output result, only the Q-component of the input sample is considered as input of the odd operation units of the circuit portion for outputting I-component of output result in the conversion process means 30, and the I-component of the input sample is considered as input of the even operation units of the circuit portion for outputting I-component of output result in the conversion process means 30. In order to calculate the Q-component Im[y] of the output result, only the I-component I of the input sample is considered as input of the odd operation units of the circuit portion for outputting Q-component of output result in the conversion process means 30, and the Q-component of the input sample is considered as input of the even operation units of the circuit portion for outputting Q-component of output result in the conversion process means 30.

Figure 7A:
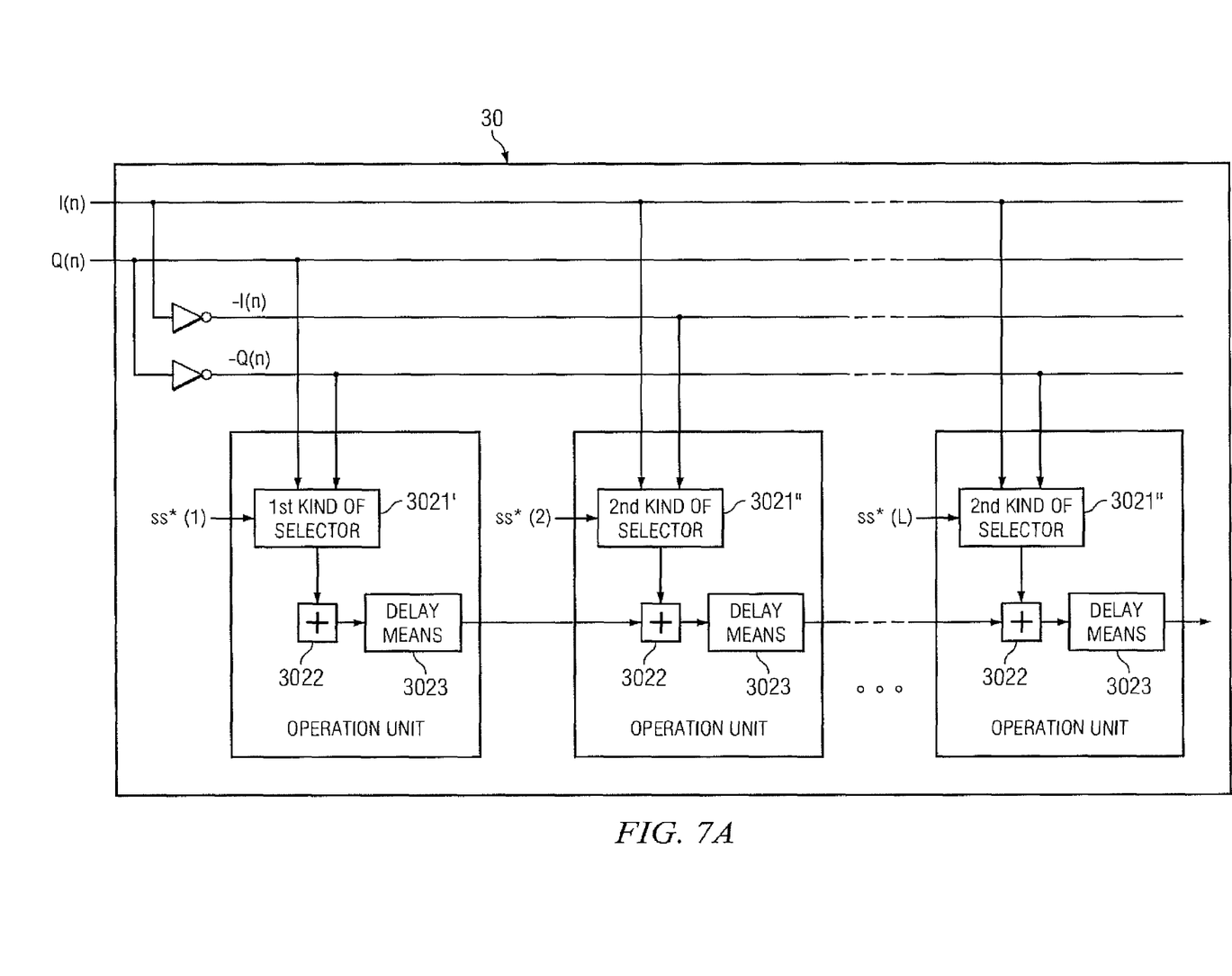
FIGS. 7A and B are schematic diagrams illustrating a specific circuit implementing manner of each circuit part used for the I-components and the Q-components of output results of the conversion process means in a TD-SCDMA system respectively.
Figure 7B:
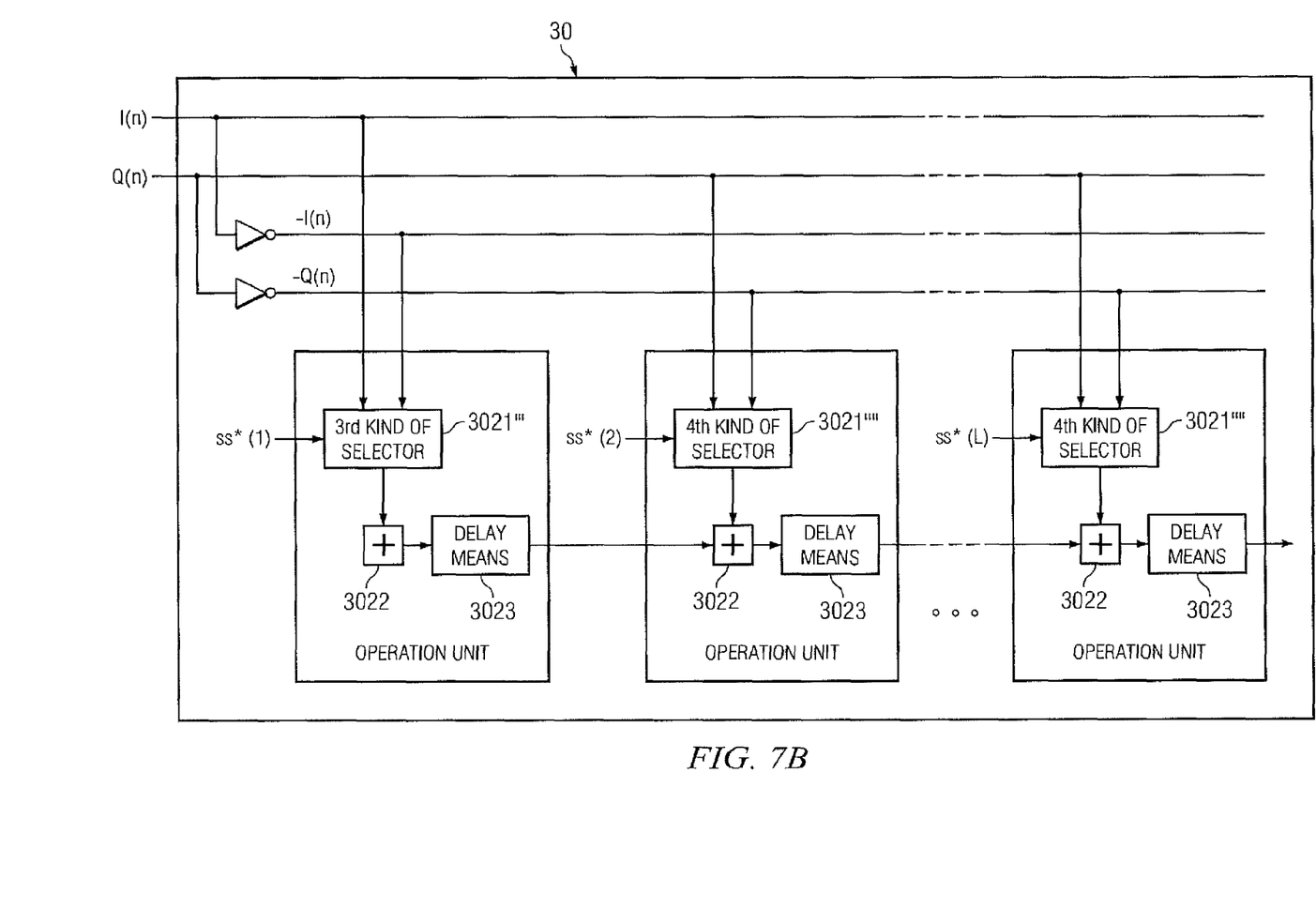

Therefore, for TD-SCDMA wireless communication systems, the two circuit portions for outputting the I-component and Q-component of the output result of the conversion process means 30 of the matched filter can use four kinds of selectors respectively, as shown in FIGS. 7A-B. The I-component of the output result is shown in FIG. 7A. For the odd operation units to calculate the I-component of the output result of the conversion process means 30, the first kind of selector 1 3021' is adopted, which is defined as $$Selector1 = \begin{cases} -Q & ss^*[i] = j \\ Q & ss^*[i] = -j \end{cases} \quad (3)$$

For the even operation units to calculate the I-component of the output result of the conversion process means 30, the second kind of selector (selector 2) 3021" is used, which is defined as"

$$Selector2 = \begin{cases} I & ss^*[i] = 1 \\ -I & ss^*[i] = -1 \end{cases} \quad (4)$$

For the purpose of being concise, suppose L is even. Therefore, in the circuit shown in FIG. 7A, the L selector is the second kind of selection 3021".

The I-component of the output result is shown in FIG. 7B, for the odd operation units to calculate the Q-component of the output result of the conversion process means 30, the third kind of selector (selector 3) 3021''' is used, which is defined as $$Selector3 = \begin{cases} I & ss^*[i] = j \\ -I & ss^*[i] = -j \end{cases} \quad (5)$$

For the even operation units to calculate the Q-component of the output result of the conversion process means 30, the fourth kind of selector (selector 4) 3021'''' is used, which is defined as:

$$Selector4 = \begin{cases} Q & ss^*[i] = 1 \\ -Q & ss^*[i] = -1 \end{cases} \quad (6)$$

Likewise, for the purpose of being concise, suppose L is even, the L selector is the fourth kind of selector 3021'''' in the circuit of FIG. 7B.

Figure 8:
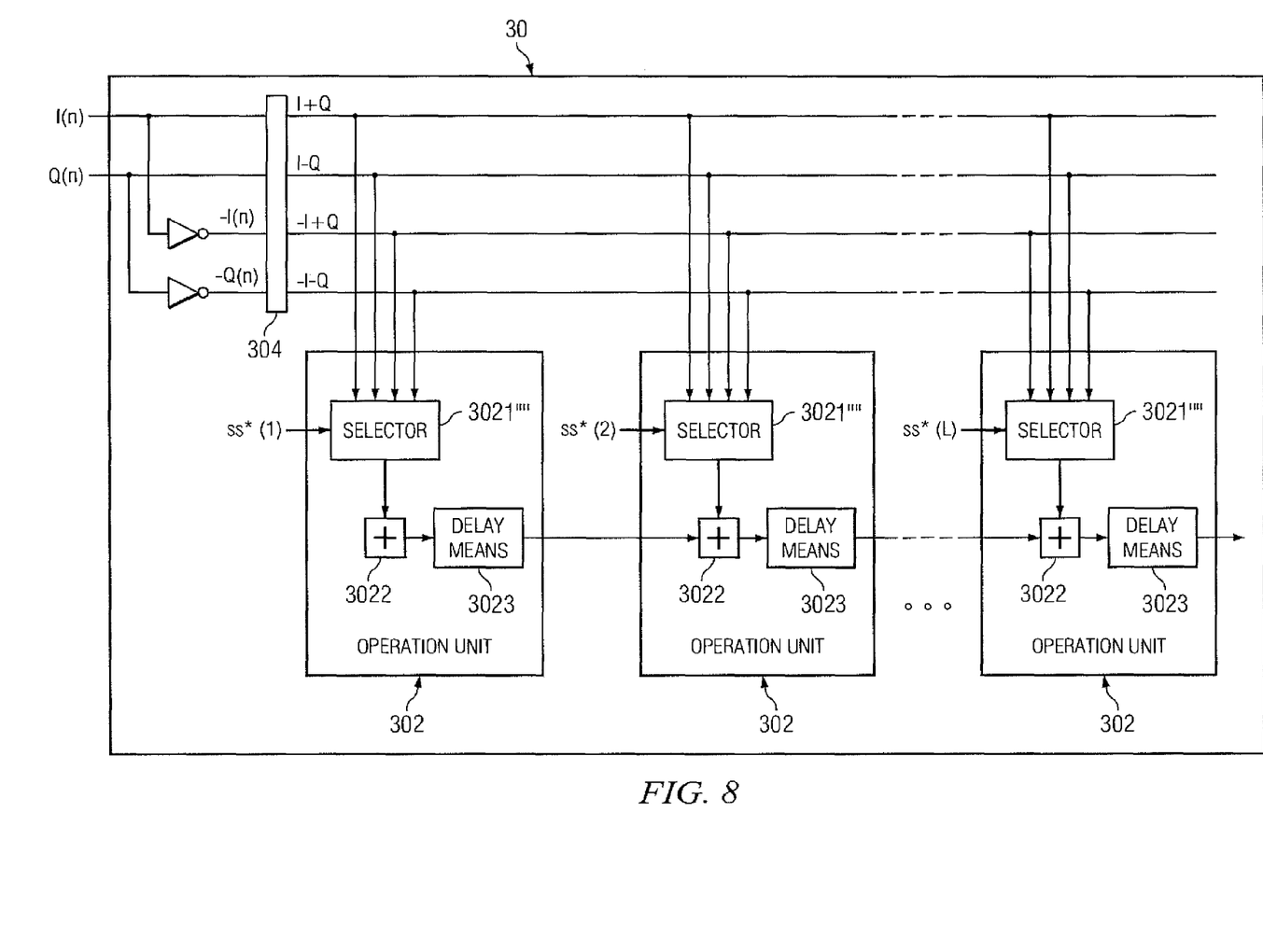
FIG. 8 is schematic diagrams illustrating a specific circuit implementing manner of each circuit part used for the I-components and the Q-components of output results of the conversion process means in a WCDMA system.

As shown in FIG. 8, in WCDMA systems, the selector 3021"f can also be used to realize the combiner 3021 as shown in FIG. 6, but it needs to add a conversion circuit 304 before the input of respective selectors, the conversion circuit 304 is used to convert the I-component, Q-component, the negated I-component and the negated Q-component of the input sample into four input signals I+Q, I−Q, −I+Q and −I−Q to be selected by logical operations (for example, four adders), thereby simplifying the circuit configuration once again, the specific circuit structure is shown in FIG. 8. Preferably, two negators shown in FIG. 8 are also included in the conversion circuit 304. The selector for I-component and Q-component of the output result may adopt tow kinds of selectors (selector 5 and selector 6) respectively, the selection functions thereof are as shown in the foregoing equations.

Although the present invention has been described in terms of the presently preferred embodiments, it is to be understood that such a disclosure is not construed as limiting. Various alternations and modifications will no doubt become apparent to those skilled in the art after reading the above disclosure. Accordingly, it is intended that the appended claims be interpreted as covering all alternations and modifications as falling into the true spirit and scope of the invention.

The invention claimed is:

1. A method for implementing matched filters in a wireless communication system, comprising:
   oversampling and extracting a pre-processed received signal so as to obtain the in phase components and the quadrature components of respective sample points in a plurality of sampling sequences;
   converting and combining the in phase components and the quadrature components of respective sample points in the same sampling sequence for the respective sampling sequence according to a pre-defined selection signal so as to obtain a plurality of corresponding matched filtered results; and buffering and comparing the plurality of matched filtered results, so as to determine an optimum matched sampling sequence, the matched filtered result to which the optimum matched sampling sequence corresponds has the greatest value.

2. The method according to claim 1, wherein the pre-defined selection signal is based on a known training sequence.

3. The method according to claim 2, wherein the length of each sampling sequence is equal to the length of the known training sequence.

4. The method according to claim 3, wherein the converting and combining processing further includes performing negate operation of the in phase components and the quadrature components of the respective sample points so as to obtain the negated in phase components and the negated quadrature components.

5. The method according to claim 4, wherein the converting and combining processing further includes performing pre-defined combination operation of the in phase components, the negated in phase components, the quadrature components and the negated quadrature components of respective sample points, so as to obtain the corresponding output results of the respective sample points.

6. The method according to claim 5, wherein the converting and combining processing further includes performing accumulation operation on the output results to which respective sample points in the same sampling sequence correspond to the sampling sequences, so as to obtain the matched filtered results corresponding to the sampling sequences.

7. The method according to claim 5, wherein the output result to which the respective sample points correspond is one of a set of expected results.

8. The method according to claim 2, wherein the wireless communication system is a Time Division-Synchronous Code Division Multiple Access (TD-SCDMA)-system, the numeric value of each unit of the known training sequence is one from the set $\{1, -1, j, -j\}$.

9. The method according to claim 7, wherein the wireless communication system is a TD-SCDMA system, the set of expected results is one of the set $\{I+jQ, -I-jQ, -Q+jI, Q-jI\}$, wherein I is the in phase component, Q is the quadrature component, $-I$ is the negated in phase component, $-Q$ is the negated quadrature component.

10. The method according to claim 2, wherein the wireless communication system is a Wideband Code Division Multiple Access (WCDMA) system, the numeric value of each unit of the known training sequence is one from the set $\{1+j, 1-j, 1+j, -1-j\}$.

11. The method according to claim 7, wherein the wireless communication system is a Wideband Code Division Multiple Access (WCDMA) system, the set of expected results is one of the set $\{(I-Q)+j(I+Q), (I+Q)+j(-I+Q), (-I-Q)+j(I-Q), (-I+Q)+j(-I-Q)\}$, wherein I is the in phase component, Q is the quadrature component, $-I$ is the negated in phase component, $-Q$ is the negated quadrature component.

12. An apparatus for implementing matched filters in a wireless communication system, comprising:
an oversampling and extracting unit configured to oversample and extract a pre-processed received signal so as to obtain the in phase components and the quadrature components of respective sample points in a plurality of sampling sequences;
a conversion process unit configured to convert and combine the in phase components and the quadrature components of respective sample points in the same sampling sequence for the respective sampling sequence according to a pre-defined selection signal so as to obtain a plurality of corresponding matched filtered results;
a buffer configured to buffer the plurality of matched filtered results; and
a comparison unit configured to compare the plurality of matched filtered results that are buffered so as to determine an optimum matched sampling sequence, the matched filtered result to which the optimum matched sampling sequence corresponds has the greatest value.

13. The apparatus according to claim 12, wherein the matched filters further comprise a pre-defined unit configured to define the pre-defined selection signal based on a selection signal of a known training sequence.

14. The apparatus according to claim 13, wherein the respective sampling sequences are of the same length as the known training sequence.

15. The apparatus according to claim 14, wherein the conversion process unit comprises a negating unit configured to perform negate operation of the in phase components and the quadrature components of the respective sample points so as to obtain the negated in phase components and the negated quadrature components.

16. The apparatus according to claim 15, wherein the conversion process unit further comprises a signal combining unit configured to perform pre-defined combination operation of the in phase components, the negated in phase components, the quadrature components and the negated quadrature components of respective sample points, so as to obtain the corresponding output results of the respective sample points.

17. The apparatus according to claim 16, wherein the conversion process unit further comprises an accumulating unit configured to perform accumulation operation on the output results to which respective sample points in the same sampling sequence correspond to the sampling sequences so as to obtain the matched filtered results corresponding to the sampling sequences.

18. The apparatus according to claim 16, wherein the output result to which the respective sample points correspond is one of a set of expected results.

19. The apparatus according to claim 13, wherein the wireless communication system is a Time Division-Synchronous Code Division Multiple Access (TD-SCDMA) system, the numeric value of each unit of the known training sequence is one from the set $\{1, -1, j, -j\}$.

20. The apparatus according to claim 18, wherein the wireless communication system is a TD-SCDMA system, the set of expected results is one of the set $\{I+j Q, -I-j Q, -Q+jI, Q-jI\}$, wherein I is the in phase component, Q is the quadrature component, $-I$ is the negated in phase component, $-Q$ is the negated quadrature component.

21. The apparatus according to claim 13, wherein the wireless communication system is a Wideband Code Division Multiple Access (WCDMA) system, the numeric value of each unit of the known training sequence is one from the set $\{1+j, 1-j, 1+j, -1-j\}$.

22. The apparatus according to claim 18, wherein the wireless communication system is a Wideband Code Division Multiple Access (WCDMA) system, the set of expected results is one of the set $\{(I-Q)+j(I+Q), (I+Q)+j(-I+Q), (-I-Q)+j(I-Q), (-I+Q)+j(-I-Q)\}$, wherein I is the in phase component, Q is the quadrature component, $-I$ is the negated in phase component, $-Q$ is the negated quadrature component.

* * * * *